(12) United States Patent
Stein et al.

(10) Patent No.: US 10,560,841 B2
(45) Date of Patent: Feb. 11, 2020

(54) FACILITATING ANONYMIZED COMMUNICATION SESSIONS

(71) Applicant: Twilio Inc., San Francisco, CA (US)

(72) Inventors: Benjamin Stein, Oakland, CA (US); David Ganly, San Francisco, CA (US); Malachy McKay, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 15/988,831

(22) Filed: May 24, 2018

(65) Prior Publication Data

US 2018/0343560 A1 Nov. 29, 2018

Related U.S. Application Data

(60) Provisional application No. 62/510,415, filed on May 24, 2017.

(51) Int. Cl.
| | |
|---|---|
| *H04M 1/66* | (2006.01) |
| *H04W 12/02* | (2009.01) |
| *H04L 29/06* | (2006.01) |
| *H04W 4/02* | (2018.01) |

(52) U.S. Cl.
CPC ......... *H04W 12/02* (2013.01); *H04L 63/0421* (2013.01); *H04W 4/02* (2013.01)

(58) Field of Classification Search
CPC ...... H04W 12/02; H04W 4/02; H04L 63/0421

USPC .......................................................... 455/411
See application file for complete search history.

(56) References Cited

U.S. PATENT DOCUMENTS

| | | | | |
|---|---|---|---|---|
| 2004/0205198 | A1* | 10/2004 | Zellner | H04L 63/0281 709/228 |
| 2014/0025753 | A1* | 1/2014 | Gronowski | H04L 63/0421 709/206 |
| 2018/0077135 | A1* | 3/2018 | Wardman | H04L 63/083 |

\* cited by examiner

*Primary Examiner* — Huy C Ho
(74) *Attorney, Agent, or Firm* — Schwegman Lundberg & Woessner, P.A.

(57) ABSTRACT

Disclosed are systems, methods, and non-transitory computer-readable media for facilitating anonymized communication sessions. An anonymized communication platform receives a request to initiate an anonymized communication session between a first user and a second user of an online service. The anonymized communication platform selects, from a set of available proxy contact identifiers, a first proxy contact identifier for the first user, and a second proxy contact identifier for the second user, and generates an anonymized communication record for the anonymized communication session that indicates that that the first proxy contact identifier is assigned to the first user and the second proxy contact identifier is assigned to the second user. The anonymized communication platform causes the first proxy contact identifier and the second proxy contact identifiers to be provided to the first and second users.

20 Claims, 10 Drawing Sheets

FACILITATING ANONYMIZED COMMUNICATION SESSIONS

CROSS-REFERENCE TO RELATED APPLICATIONS

This application claims the benefit of U.S. Provisional Application No. 62/510,415, filed May 24, 2017, which is incorporated by reference herein in its entirety.

TECHNICAL FIELD

An embodiment of the present subject matter relates generally to communication sessions and, more specifically, to facilitating anonymized communication sessions.

BACKGROUND

Many online services enable their users to communicate with the online service and/or or amongst each other using their mobile devices. For example, an online service may facilitate text messages, phone call communication, etc., between a driver and a rider, a customer and a business, or between any two users of an online service. While enabling users to communicate using their mobile devices is convenient, some users may be hesitant to provide their personal contact identifier (e.g., phone number) to people that they do not know. For example, a user of a ride sharing service may not wish to share their phone number with their assigned driver. Likewise, a restaurant patron may not wish to share their phone number with the restaurant at which they made a reservations. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
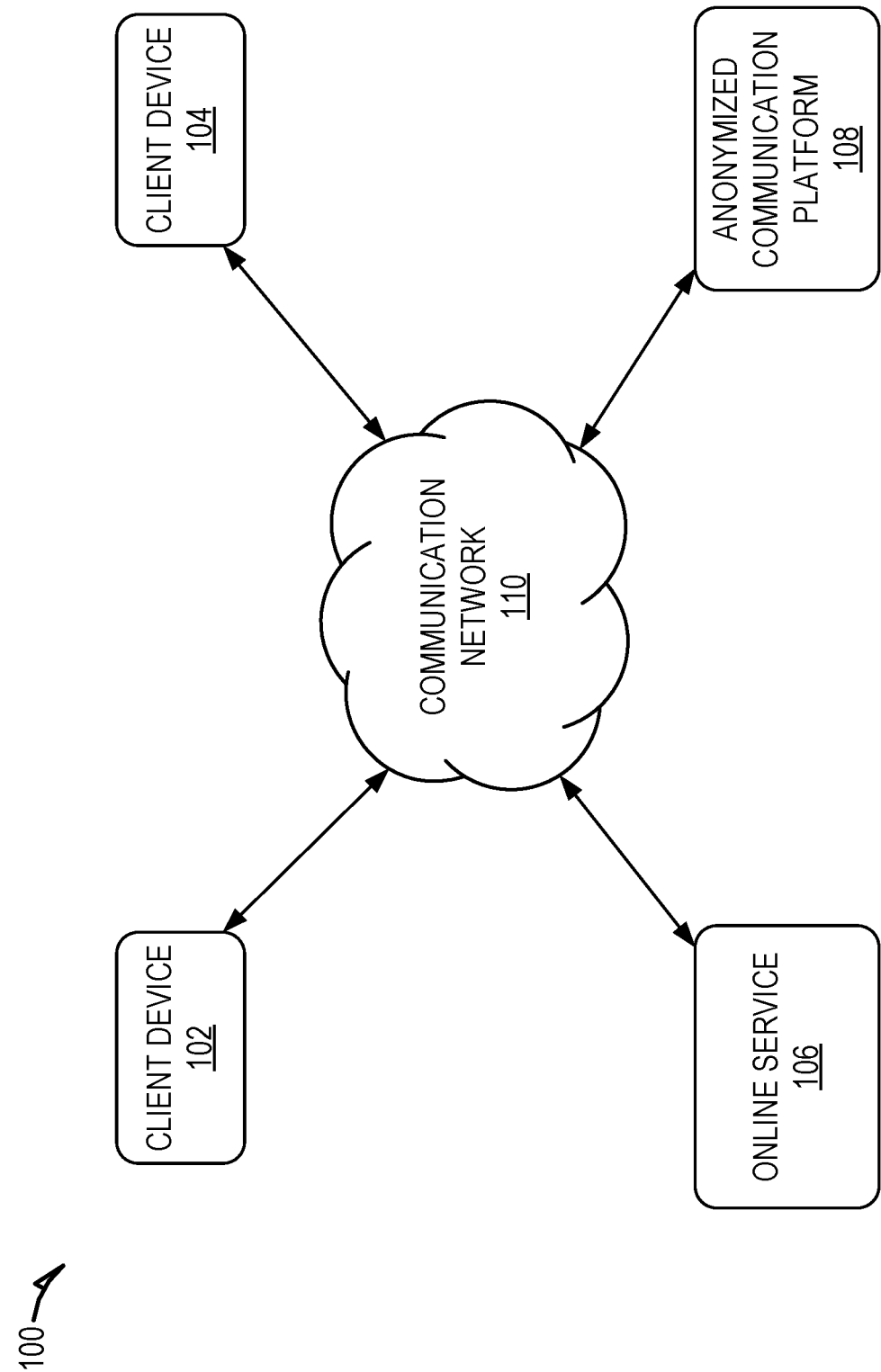
FIG. 1 shows an example system configuration, wherein electronic devices communicate via a network for purposes of exchanging content and other data.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for facilitating anonymized communication sessions. An anonymized communication platform facilitates anonymized communication sessions between users' client devices. A communication session is any type of communication between two or more client devices, such as text communication (e.g., SMS, MMS, IP messaging), voice communication (e.g., phone call), video communication (e.g., video conference), etc. An anonymized communication session is a communication session in which the participants of the communication session are not provided with the contact identifiers (e.g., phone number, Internet Protocol (IP) address, email address, etc.) of the other participants of the communication session. That is, the participants are provided with proxy contact identifiers that allow the participants to communicate with each other for a limited time and/or purpose.

The anonymized communication platform offers an Application Programming Interface (API), which can be leveraged by an online service to provide anonymized communication sessions to users of the online service. An online service may be any type of service provided online, such as a reservation service (e.g., Yelp, Open Table, etc.), ride share service (e.g., Uber, Lyft, etc.), online marketplace (e.g., Amazon, eBay, etc.), etc. An online service incorporates the API into their website and/or application, thereby allowing users of the online service to initiate anonymized communication session that are facilitated by the anonymized communication platform. For example, the API causes a request to be transmitted to the anonymized communication platform to initiate an anonymized communication session. This provides online services with an easy way to provide anonymized communication session functionality to their users, which also reduces the resource usage of the computing devices facilitating the online service.

The anonymized communication platform receives requests to initiate anonymize communication sessions between users of online services. A request may include data identifying the participants of the communication session, such as contact identifiers for client devices that will be used during the communication session. For example, the request may include phone numbers for mobile devices that will be used by the users to participate in the communication session.

In response to receiving such a request, the anonymized communication platform selects proxy contact identifiers (e.g., proxy phone numbers) for the users. The anonymized communication platform maintains a pool of available proxy contact identifiers, from which the proxy phone numbers are selected. The pool of available proxy contact identifier may be a general pool used for all users, or a pool of available proxy contact identifiers designated to a specific, user, application, set of users, etc. The anonymized communication platform may select a proxy contact identifier that is best suited for the participants of the anonymized communication session. For example, the anonymized communication platform may select proxy phone numbers that are local to the participants (e.g., phone numbers with a local area code).

The anonymized communication platform generates an anonymized communication record for an anonymized communication session. The anonymized communication record includes information used by the anonymized communication platform to facilitate the anonymized communication session. For example, the anonymized communication record includes the contact identifiers for the participants of the anonymized communication session, as well as the proxy contact identifiers assigned to the participants. The anonymized communication record may include other information, such as a start and/or expiration time for the anonymized communication session, a unique identifier for the anonymized communication session, unique user identifiers for the participants of the anonymized communication session, etc.

The anonymized communication platform causes the proxy contact identifiers to be provided to the client devices of the participants of the anonymized communication session. For example, the anonymized communication platform transmits the proxy contact identifiers directly to the client devices or provides them to the online service, which then forwards the proxy contact identifiers to the client devices. The proxy contact identifiers enable the participants to engage in the anonymized communication session with the other participants of the anonymized communication session. For example, a user may use the provided proxy contact identifier to send a text message, initiate, a phone call, etc., with the other participants. The anonymized communication platform may provide the proxy contact identifiers to each participant, or only a subset of the participants. For example, the anonymized communication platform may provide the proxy contact identifiers to only one of the participants.

Communications initiated by a client device using a proxy contact identifier are initially routed to the anonymized communication platform. That is, the anonymized communication platform acts as an intermediary between the client devices used to participate in an anonymized communication session. In response to receiving a communication initiated using a proxy contact identifier, the anonymized communication platform identifies the contact identifier corresponding to the proxy contact identifier. For example, the anonymized communication platform determines the corresponding contact identifier from the anonymized communication record for the anonymized communication session. The anonymized communication platform uses the appropriate contact identifier to complete the received communication. For example, the anonymized communication platform uses the contact identifier to forward a received message to the client device, or initiate a phone call between the client devices.

FIG. 1 shows an example system configuration 100, wherein electronic devices communicate via a network for purposes of exchanging content and other data. As shown, multiple devices (i.e., client device 102, client device 104, online service 106, and anonymized communication platform 108) are connected to a communication network 110 and configured to communicate with each other through use of the communication network 110. The communication network 110 is any type of network, including a local area network ("LAN"), such as an intranet, a wide area network ("WAN"), such as the internet, or any combination thereof. Further, the communication network 110 may be a public network, a private network, or a combination thereof. The communication network 110 is implemented using any number of communications links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of the machine 1000 shown in FIG. 10.

To facilitate communication with other computing devices, a computing device includes a communication interface configured to receive a communication, such as a request, data, etc., from another computing device in network communication with the computing device and pass the communication along to an appropriate component running on the computing device. The communication interface also sends a communication to another computing device in network communication with the computing device.

In the system 100, users interact with an online service 106 to utilize the functionality provided by the online service 106. For example, users use the client devices 102 and 104 that are connected to the communication network 110 by direct and/or indirect communication to communicate with and utilize the functionality of the online service 106. The online service 106 may be any type of service provided online, such as a ride sharing service, reservation service, retail service, news service, etc.

Although the shown system 100 includes only two client devices 102, 104, and one online service 106, this is only for ease of explanation and is not meant to be limiting. One skilled in the art would appreciate that the system 100 can include any number of client devices 102, 104 and online services 106. Further, an online service 106 may concurrently accept connections from and interact with any number of client devices 102, 104. The online service 106 supports connections from a variety of different types of client devices 102, 104, such as desktop computers; mobile computers; mobile communications devices, e.g. mobile phones, smart phones, tablets; smart televisions; set-top boxes; and/or any other network enabled computing devices. Hence, the client devices 102 and 104 may be of varying type, capabilities, operating systems, etc.

A user interacts with the online service 106 via a client-side application installed on the client devices 102 and 104. In some embodiments, the client-side application includes an online service 106 specific component. For example, the component may be a stand-alone application, one or more application plug-ins, and/or a browser extension. However, the users may also interact with the online service 106 via a third-party application, such as a web browser, that resides on the client devices 102 and 104 and is configured to communicate with the online service 106. In either case, the client-side application presents a user interface (UI) for the user to interact with the online service 106. For example, the user interacts with the online service 106 via a client-side application integrated with the file system or via a webpage displayed using a web browser application.

The online service 106 is one or more computing devices configured to provide an online service. As explained previously, the online service 106 may be any type of service, such as ride share service, reservation service, etc. As a part of its provided functionality, the online service 106 may enable users of the online service to communicate with each other and/or with employees of the online service 106. That is, the online service 106 may enable users to initiate anonymized communication sessions with other users and/or employees of the online service in which the participants of the communication session may communicate with each other via voice, text, etc. For example, a reservation service may allow a user to initiate an anonymized communication session with a restaurant at which the user has made a reservation, or vice versa. Likewise, a ride sharing service may allow a rider and driver to initiate an anonymized communication session with each other to coordinate a pick-up location.

A communication session is any type of communication between two or more client devices 102, 104, such as text communication, voice communication (e.g., phone call), video communication (e.g., video conference), etc. An anonymized communication session is a communication session in which the participants of the communication session are not provided with the contact identifiers (e.g., phone number, Internet Protocol (IP) address, email address, etc.) of the other participants of the communication session. That is, the participants are provided with proxy contact identifiers that allow the participants to communicate with each other for a limited time and/or purpose.

The online service 106 may rely on the anonymized communication platform 108 to provide anonymized communication session functionality to its users, rather than developing and maintaining this functionality itself. In this way, the anonymize communication platform provides a Software as a Service (SaaS). The anonymized communication platform 108 offers an Application Programming Interface (API), which can be leveraged by an online service 106 to provide anonymized communication sessions to users of the online service 106. The online service 106 simply incorporates the API into their website and/or application, thereby allowing users of the online service 106 to initiate anonymized communication session as part of their service, however the anonymized communication sessions are facilitated by the anonymized communication platform 108. For example, the API causes a request to be transmitted to the anonymized communication platform 108 to initiate an anonymized communication session. This provides the online service 106 with an easy way to provide anonymized communication session functionality to their users, which also reduces the resource usage of the computing devices facilitating the online service 106.

The anonymized communication platform 108 receives requests to initiate anonymize communication sessions between users of the online service 106. The request may include data identifying the participants of the communication session, such as contact identifiers for client devices 102, 104 that will be used during the communication session. For example, the request may include phone numbers for the client devices 102, 104 that will be used by the users to participate in the communication session.

In response to receiving such a request, the anonymized communication platform 108 selects proxy contact identifiers (e.g., proxy phone numbers) for the users. The anonymized communication platform 108 maintains a pool of available proxy contact identifiers, from which the proxy phone numbers are selected. The anonymized communication platform 108 may select a proxy contact identifier that is best suited for the participants of the anonymized communication session. For example, the anonymized communication platform 108 may select proxy phone numbers that are local to the participants (e.g., phone numbers with a local area code).

The anonymized communication platform 108 generates an anonymized communication record for an anonymized communication session. The anonymized communication record includes information used by the anonymized communication platform 108 to facilitate the anonymized communication session. For example, the anonymized communication record includes the contact identifiers for the participants of the anonymized communication session, as well as the proxy contact identifiers assigned to the participants. The anonymized communication record may include other information, such as a start and/or expiration time for the anonymized communication session, a unique identifier for the anonymized communication session, unique user identifiers for the participants of the anonymized communication session, etc.

The anonymized communication platform 108 generates an anonymized communication record for each initiate anonymized communication session. Accordingly, a single user may be a participant in multiple anonymized communication sessions, each of which utilizes different proxy contact identifiers. In this way, the anonymized communication platform 108 may simultaneously provide multiple instances of anonymized communication sessions to multiple users.

The anonymized communication platform 108 causes the proxy contact identifiers to be provided to the client devices 102, 104 of the participants of the anonymized communication session. For example, the anonymized communication platform 108 transmits the proxy contact identifiers directly to the client devices 102, 104 or provides them to the online service 106, which then forwards the proxy contact identifiers to the client devices 102, 104. The proxy contact identifiers enable the participants to engage in the anonymized communication session with the other participants of the anonymized communication session. For example, a user may use the provided proxy contact identifier to send a text message, initiate, a phone call, etc., from their client device 102 to a client device 104 of another participant of the anonymized communication session.

Communications initiated by a client device 102, 104 using a proxy contact identifier are initially routed to the anonymized communication platform 108. That is, the anonymized communication platform 108 acts as an intermediary between the client devices 102, 104 used to participate in an anonymized communication session. In response to receiving a communication initiated using a proxy contact identifier, the anonymized communication platform 108 identifies the contact identifier corresponding to the proxy contact identifier. For example, the anonymized communication platform 108 determines the corresponding contact identifier from the anonymized communication record for the anonymized communication session. The anonymized communication platform 108 uses the appropriate contact identifier to complete the received communication. For example, the anonymized communication platform 108 uses the contact identifier to forward a received message to the intended client device 102, 104, or initiates a phone call between the client devices 102, 104.

Figure 2:
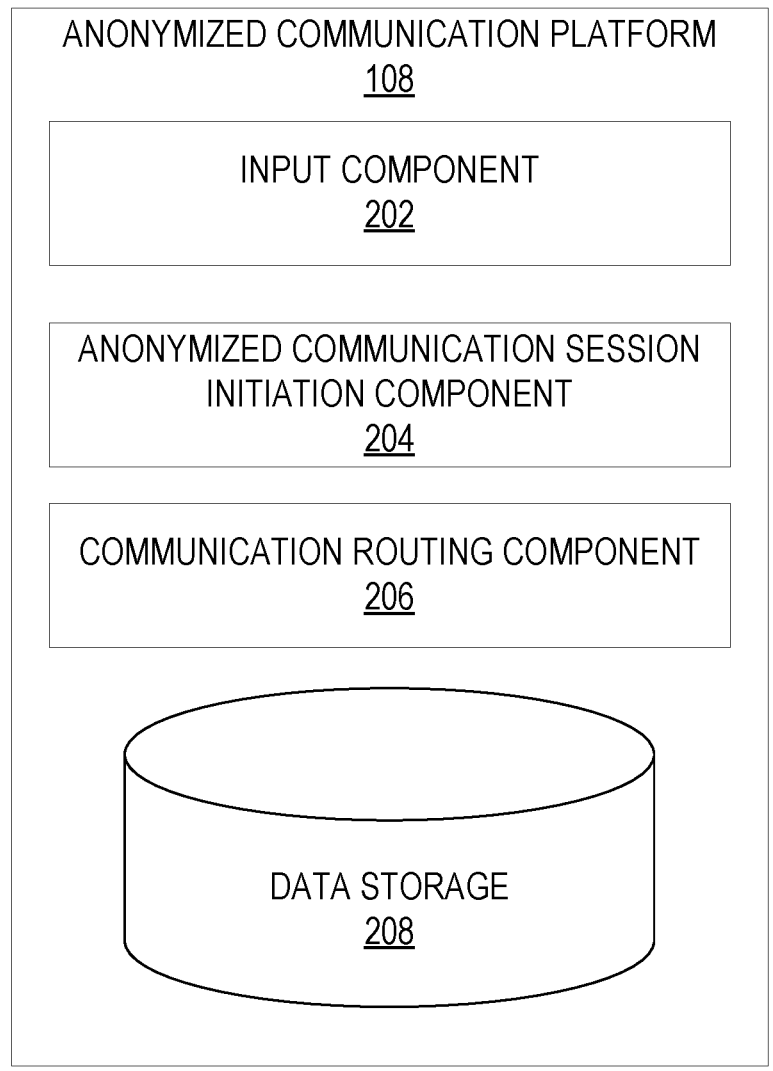
FIG. 2 is a block diagram of the anonymized communication platform, according to some example embodiments.

FIG. 2 is a block diagram of an anonymized communication platform 108, according to some example embodiments. To avoid obscuring the inventive subject matter with unnecessary detail, various functional components (e.g., components) that are not germane to conveying an understanding of the inventive subject matter have been omitted from FIG. 2. However, a skilled artisan will readily recognize that various additional functional components may be supported by the anonymized communication platform 108 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the anonymized communication platform 108 includes an input component 202, an anonymized communication session initiation component 204, a communication routing component 206, and a data storage 208. The input component 202 receives requests to initiate an anonymized communication session. A request may be received from either a client device 102, 104, or an online service 106. A request includes data that is used to initiate the communication session. For instance, the request includes data identifying the participants of the communication session, such as unique user/account identifiers assigned to the users, contact identifiers associated with the participants' client devices 102, 104, location information associated with the participants, etc. The request may also include information describing conditions of the anonymized communication session. For example, the request may include a start time and end time of the communication session, types of communications authorized for the communication session, etc.

The anonymized communication session may be initiated preemptively or, alternatively, dynamically. That is, the anonymized communication session may be preemptively created prior to the participants of the anonymized communication session attempting to communicate with each other, or dynamically in response to participants attempting to communicate. Requests to preemptively initiate an anonymized communication session are received from the online service 106, rather than from a participant's client device 102, 104. The online service 106 transmits the request to the anonymized communication platform 108 in response to the participants being paired or otherwise associated through the services provided by the online service 106. For example, the online service 106 transmits the request in response to a rider and driver being paired as part of a ride sharing service.

As another example, the online service 106 transmits the request in response to a customer making a reservation at a restaurant.

In contrast, requests to dynamically create an anonymized communication session are received from a participant's client device 102, 104, in response to the participant attempting to communicate with other users of the online service 106. In this type of embodiment, the user is initially provided with a proxy contact identifier that the user may use to request communication with other users of the online service 106. The online service 106 provides users with the proxy contact identifier to initiate the anonymized communication session when the users are paired or otherwise associated through the services provided by the online service 106. For example, the online service 106 provides a rider and/or driver with a contact identifier when the rider and driver are paired through the online service 106. As another example, the online service 106 provides a user and/or a restaurant with a proxy contact identifier when the user makes a reservation at the restaurant through the online service 106. Initiating an anonymized communication session preemptively and dynamically are discussed in greater detail below in relation to FIGS. 7 and 8.

The anonymized communication session initiation component 204 initiates an anonymized communication session in response to receiving a request. That is, the anonymized communication session initiation component 204 selects proxy contact identifiers to be used during the anonymized communication session, generates an anonymized communication record, and causes the selected proxy contact identifiers to be provided to the client devices 102, 104 of the participants of anonymized communication session.

The anonymized communication platform 108 maintains a pool of available proxy contact identifiers in the data storage 208. The pool of available proxy contact identifiers includes a listing of proxy contact identifiers maintained by the anonymized communication platform 108 that are not currently allocated for use in anonymized communication sessions. For example, the listing may include each proxy contact identifier, and data indicating whether the proxy contact identifier is available for use in an anonymized communication session. For example, each proxy contact identifier may be flagged or otherwise marked as being in use and therefore unavailable. Similarly, proxy contact identifiers that are available (e.g., are not allocated to an anonymized communication session) may be flagged or otherwise marked as being available for use.

In response to receiving a request to initiate an anonymized communication session, the anonymized communication session initiation component 204 communicates with the data storage 208 to access the pool of available proxy contact identifiers. The anonymized communication session initiation component 204 selects one or more available proxy contact identifiers for use in the anonymized communication session. For example, the anonymized communication session initiation component 204 identifies proxy contact identifiers that are not being used in other anonymized communication sessions, and the selects a proxy contact identifier from the identified proxy contact identifiers that are available. The anonymized communication session initiation component 204 may select a unique proxy contact identifier for each participant of the anonymized communication session or, alternatively, select a proxy contact identifier that will be used by multiple participants of the communication session.

The anonymized communication session initiation component 204 may select proxy contact identifiers that are best suited for the participants of the anonymized communication session. For example, the anonymized communication session initiation component 204 may select proxy contact identifiers based on the location of a participant of the anonymized communication session. That is, the anonymized communication session initiation component 204 may select a phone number that has an area code that is local to a participant of the communication session.

Upon selecting a proxy contact identifier for use in an anonymized communication session, the anonymized communication session initiation component 204 updates the pool of available proxy contact identifiers to indicate that the selected proxy contact identifier is no longer available. For example, the anonymized communication session initiation component 204 updates the listing of proxy contact identifiers to update the status of the selected proxy contact identifier as being flagged or otherwise marked as unavailable and/or in use by an anonymized communication session.

The anonymized communication session initiation component 204 generates an anonymized communication record for the anonymized communication session. The anonymized communication record includes data associated with the anonymized communication session, such as the contact identifiers for the client devices 102, 104 of the participants of the anonymized communication session, as well as the proxy contact identifiers assigned for use by the participants. The anonymized communication record may also include a unique identifier assigned to the anonymized communication session and/or account/user identifiers for the participants of the anonymized communication session. The anonymized communication record may also include data describing conditions for the anonymized communication session, such as a start and end time of the anonymized communication session, types of communications that can be transmitted as part of the anonymized communication session, client devices 102, 104, that are authorized for use in the anonymized communication session, etc.

The anonymized communication session initiation component 204 stores the generated anonymized communication record in the data storage 208. The stored anonymized communication record may be associated with the unique identifier assigned to the anonymized communication session, which may be used to search for and identify the anonymized communication record.

The anonymized communication session initiation component 204 further causes the selected proxy contact identifiers to be transmitted to the participants' client device 102, 104. For example, the anonymized communication session initiation component 204 transmits the proxy contact identifiers to the participants' client devices 102, 104 directly. Alternatively, the anonymized communication session initiation component 204 provides the proxy contact identifiers to the online service 106, and the online service 106 provides the proxy contact identifiers to the participants' client devices 102, 104. The functionality of the anonymized communication session initiation component 204 is described in greater detail in relation to FIG. 3.

The communication routing component 206 routes communications received as part of an anonymized communication session to their intended recipient. The proxy contact identifiers enable the participants of the anonymized communication session to send communications to each other, while also hiding the actual contact identifiers of the participants. A communication may be any of a variety of communications that may be initiated by a client device 102, 104, such as a text message, instant message, phone call, etc.

The proxy contact identifiers enable client device 102, 104 to transmit a communication to the anonymized communication platform 108, which acts as an intermediary between the client devices 102, 104 used in the anonymized communication session. The communication routing component 206 receives communications transmitted using a proxy contact identifier and then forwards the communications to their intended recipient. In response to receiving a communication that was transmitted using a proxy contact identifier, the communication routing component 206 identifies the anonymized communication record associated with the anonymized communication session. For example, the communication routing component 206 uses the proxy contact identifier to search for the anonymized communication record in the data storage 208 that corresponds to the anonymized communication session. As another example, the communication may include the unique identifier associated with the anonymized communication session, which the communication routing component 206 uses to identify the corresponding anonymized communication record in the data storage 208.

The communication routing component 206 uses the anonymized communication record to identify the contact identifier for the recipient participant of the anonymized communication session, as well as to determine whether the communication is authorized. That is, the communication routing component 206 identifies conditions of the anonymized communication session from the anonymized communication session record, and ensures that the conditions are met prior to forwarding the communication. For example, the communication routing component 206 ensures that the communication is transmitted from an authorized client device 102, 104, is within an approved time frame, is an authorized communication type, etc. The communication routing component 206 may deny a communication if one or more of the conditions are not met.

If the conditions are met, the communication routing component 206 uses the contact identifiers retrieved from the anonymized communication record to forward the communication to the intended recipient's client device 102, 104. This may include forwarding a message, such as a text message, instant message, etc., to the recipient's client device 102, 104, or connecting the client devices 102, 104 of the sender and recipient participants. For example, the communication routing component 206 may cause the client device 102, 104 to be connected for audio communication, such as a phone call. The functionality of the communication routing component 206 is described in greater detail in relation to FIG. 4.

Figure 3:
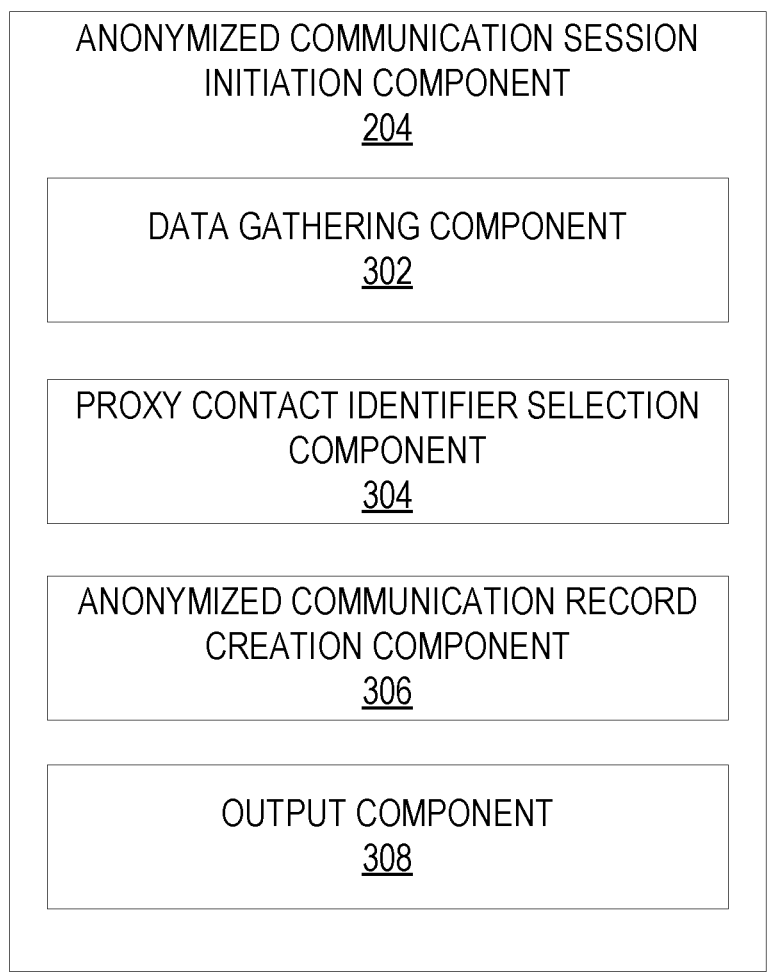
FIG. 3 is a block diagram of the anonymized communication session initiation component, according to some example embodiments.

FIG. 3 is a block diagram of the anonymized communication session initiation component 204, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the anonymized communication session initiation component 204 to facilitate additional functionality that is not specifically described herein. Furthermore, the various functional components depicted in FIG. 3 may reside on a single computing device or may be distributed across several computing devices in various arrangements such as those used in cloud-based architectures.

As shown, the anonymized communication session initiation component 204 includes a data gathering component 302, a proxy contact identifier selection component 304, an anonymized communication record creation component 206, and an output component 308.

The data gathering component 302 gathers data used to initiate an anonymized communication session. This includes contact identifiers for the participants' client device 102, 104, user/account identifiers for the participants, geographic location of the participants, conditions for the anonymized communication session, etc. This data may be included in the request received from a client device 102, 104, or gathered from the online service 106. For example, the data gathering component 302 communicates with the online service 106 and requests any needed data.

The proxy contact identifier selection component 304 selects proxy contact identifiers for the participants of the anonymized communication session. The anonymized communication platform 108 maintains a pool of available proxy contact identifiers in the data storage 208. The pool of available proxy contact identifiers includes a listing of proxy contact identifiers maintained by the anonymized communication platform 108 that are not currently allocated for use in anonymized communication sessions. For example, the listing may include a listing of each proxy contact identifier along with a data indicating whether each proxy contact identifier is allocated in anonymized communication sessions or is available for use in an anonymized communication session.

The proxy contact identifier selection component 304 communicates with the data storage 208 to access the pool of available proxy contact identifiers, and selects one or more available proxy contact identifiers for use in the anonymized communication session. For example, the proxy contact identifier selection component 304 identifies proxy contact identifiers that are not being used for other anonymized communication sessions, and then selects from the set identified proxy contact identifiers. The proxy contact identifier selection component 304 may select a unique proxy contact identifier for each participant of the anonymized communication session or, alternatively, select a proxy contact identifier that will be used by multiple participants of the communication session.

The proxy contact identifier selection component 304 may select proxy contact identifiers that are best suited for the participants of the anonymized communication session. For example, the proxy contact identifier selection component 304 may select proxy contact identifiers based on the location of a participant of the anonymized communication session. That is, the proxy contact identifier selection component 304 may select a phone number that has an area code that is local to a participant of the communication session.

Upon selecting a proxy contact identifier for use in an anonymized communication session, the proxy contact identifier selection component 304 updates the pool of available proxy contact identifiers to indicate that the selected proxy contact identifier is no longer available. For example, the proxy contact identifier selection component 304 updates the status of the selected proxy contact identifier to indicate that they are in use by an anonymized communication session.

The anonymized communication record creation component 306 generates an anonymized communication record for an anonymized communication session. The anonymized communication record includes data associated with the anonymized communication session, such as the contact identifiers for the client devices 102, 104 of the participants of the anonymized communication session, as well as the proxy contact identifiers assigned for use by the participants.

The anonymized communication record creation component 306 may generate a unique identifier for the anonymized communication session, which is stored in the anonymized communication record along with account/user identifiers for the participants of the anonymized communication session. The anonymized communication record may also include data describing conditions for the anonymized communication session, such as a start and end time of the anonymized communication session, types of communications that can be transmitted as part of the anonymized communication session, client devices 102, 104, that are authorized for use in the anonymized communication session, etc.

The anonymized communication record creation component 306 stores the generated anonymized communication record in the data storage 208. The stored anonymized communication record may be associated with the unique identifier assigned to the anonymized communication record, which may be used to search for and identify the anonymized communication record.

The output component 308 causes the selected proxy contact identifiers to be transmitted to the client devices 102, 104 of the participants of the anonymized communication session. For example, the output component 308 transmits the proxy contact identifiers to the client devices 102, 104 directly. Alternatively, the output component 308 provides the proxy contact identifiers to the online service 106, and the online service 106 provides the proxy contact identifiers to the client devices 102, 104.

Figure 4:
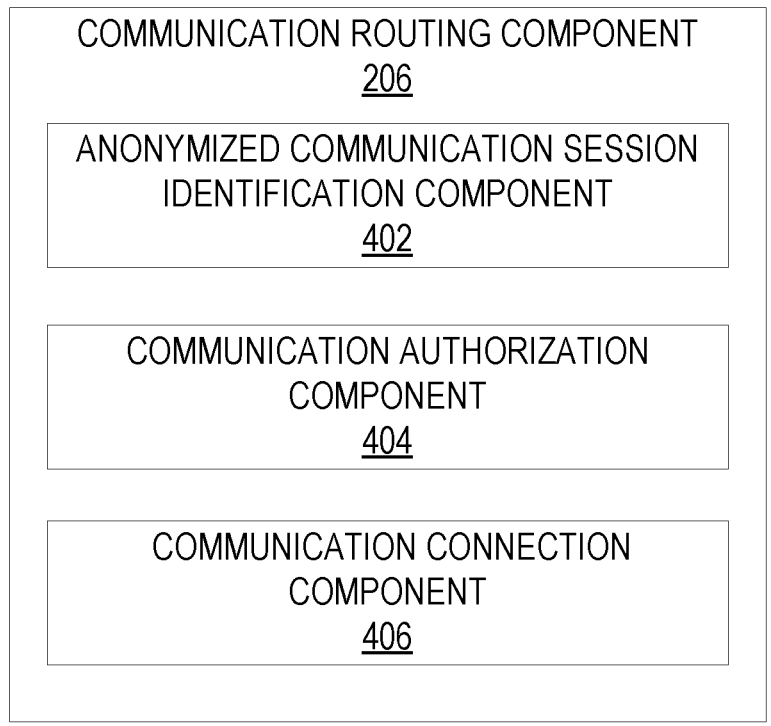
FIG. 4 is a block diagram of the communication routing component, according to some example embodiments.

FIG. 4 is a block diagram of the communication routing component 206, according to some example embodiments. To avoid obscuring the inventive subject matter with unnecessary detail, various functional components (e.g., components) that are not germane to conveying an understanding of the inventive subject matter have been omitted from FIG. 4. However, a skilled artisan will readily recognize that various additional functional components may be supported by the communication routing component 206 to facilitate additional functionality that is not specifically described herein. Furthermore, the various functional components depicted in FIG. 4 may reside on a single computing device or may be distributed across several computing devices in various arrangements such as those used in cloud-based architectures.

As shown, the communication routing component 206 includes an anonymized communication session identification component 402, a communication authorization component 404, and a communication connection component 406.

The communication routing component 206 routs communications received as part of an anonymized communication session to their intended recipient. As explained above, the proxy contact identifiers enable client devices 102, 104 to transmit a communication to the anonymized communication platform 108, which acts as an intermediary between the client devices 102, 104 used in the anonymized communication session. The communication routing component 206 receives communications transmitted using proxy contact identifiers and forwards the communications to their intended recipients.

The anonymized communication session identification component 402 identifies the anonymized communication record associated with a communication received as part of an anonymized communication session. A communication received as part of an anonymized communication session is a communication received from a client device 102, 104 that was transmitted using a proxy contact identifier assigned to the anonymized communication system. In response to receiving a communication transmitted using a proxy contact identifier, the anonymized communication session identification component 402 searches the data storage 208 for the anonymized communication record corresponding to the anonymized communication session. For example, the communication may include the unique identifier associated with the anonymized communication session, which the anonymized communication session identification component 402 uses to identify the appropriate anonymized communication record in the data storage 208. Alternatively, the anonymized communication session identification component 402 identifies the anonymized communication record based on the proxy contact identifier used to transmit the communication.

The data included in the anonymized communication record is used to identify contact identifiers for the participants of the anonymized communication session, as well as to determine whether a communication should authorized.

The communication authorization component 404 determines whether a received communication is authorized to be forwarded to other participants of the communication session. That is, the communication authorization component 404 identifies conditions of the anonymized communication session from the anonymized communication session record, and ensures that the conditions are met. For example, the communication authorization component 404 ensures that the communication is transmitted from an authorized client device 102, 104, is within an approved time frame, etc. The communication authorization component 404 may deny the communication if one or more of the conditions are not met.

If the conditions are met, the communication connection component 406 uses the contact identifiers retrieved from the anonymized communication record to forward the communication to its intended recipient's client device 102, 104. This may include forwarding a message, such as a text message, instant message, etc., to the recipient's client device 102, 104, or connecting the client devices 102, 104 of the sender and recipient participants. For example, the communication connection component 406 may cause the client device 102, 104 to be connected for audio communication, such as a phone call.

Figure 5:
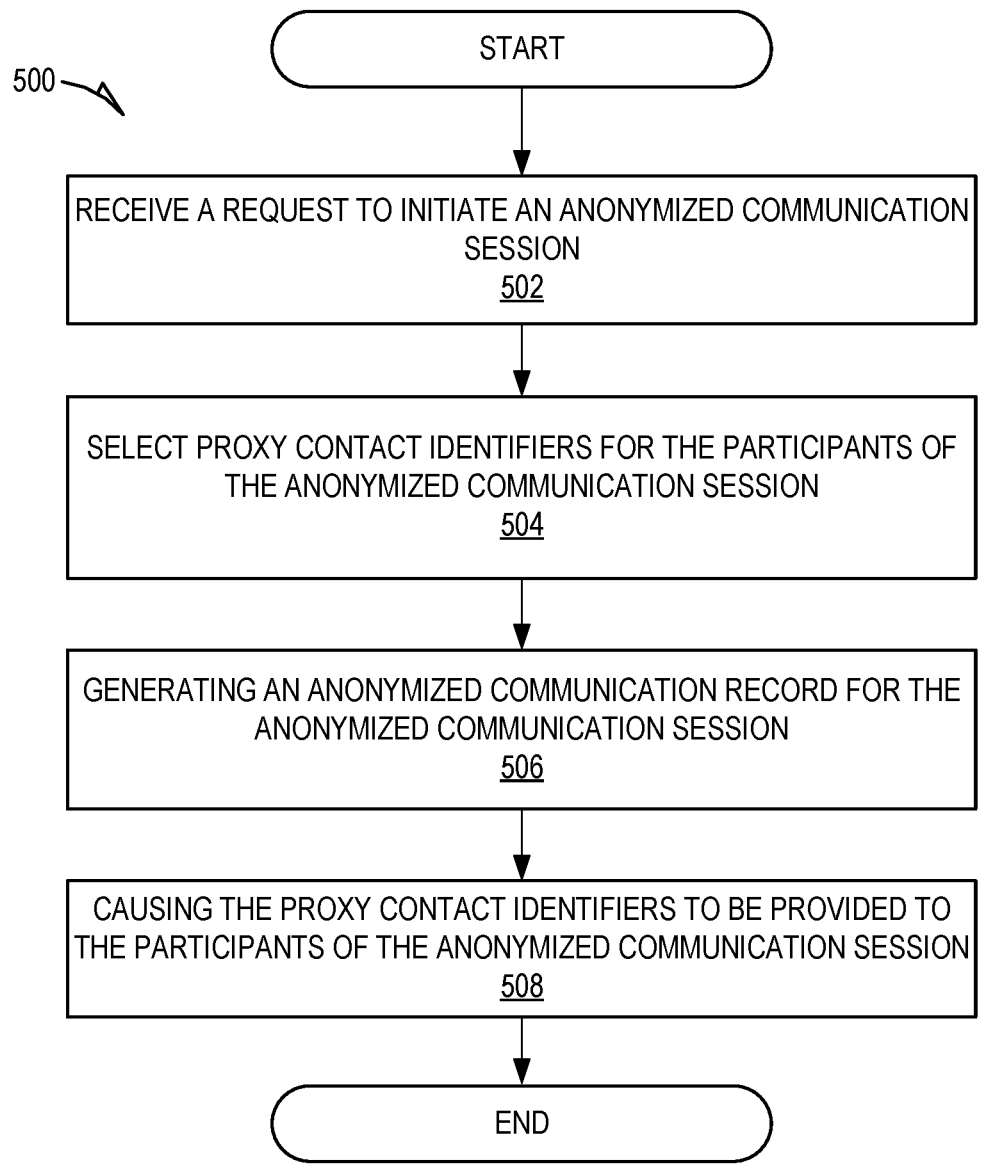
FIG. 5 is a flowchart showing an example method of initiating an anonymized communication session, according to some example embodiments.

FIG. 5 is a flowchart showing an example method 500 of initiating an anonymized communication session, according to some example embodiments. The method 500 may be embodied in computer readable instructions for execution by one or more processors such that the operations of the method 500 may be performed in part or in whole by the anonymized communication platform 108; accordingly, the method 500 is described below by way of example with reference thereto. However, it shall be appreciated that at least some of the operations of the method 500 may be deployed on various other hardware configurations and the method 500 is not intended to be limited to the anonymized communication platform 108.

At operation 502, the input component 202 receives a request to initiate an anonymized communication session. A request may be received from either a client device 102, 104, or an online service 106. A request includes data that is used to initiate the communication session. For instance, the request includes data identifying the participants of the communication session, such as unique user/account identifiers assigned to the users, contact identifiers associated with the participants' client devices 102, 104, location information associated with the participants, etc. The request may also include information describing conditions of the anonymized communication session. For example, the request may include a start time and end time of the communication session, types of communications authorized for the communication session, etc.

At operation 504, the proxy contact identifier selection component 304 selects proxy contact identifiers for the participants of the anonymized communication session. The anonymized communication platform 108 maintains a pool of available proxy contact identifiers in the data storage 208. The pool of available proxy contact identifiers includes a listing of proxy contact identifiers maintained by the anonymized communication platform 108 that are not currently allocated for use in other anonymized communication sessions. For example, the listing may include a listing of each proxy contact identifier along with data indicating a status of the proxy contact identifier (e.g., whether each proxy contact identifier is allocated in anonymized communication sessions or is available for use in an anonymized communication session). The pool of available proxy contact identifier may be a general pool used for all users, or a pool of available proxy contact identifiers designated to a specific, user, application, set of users, etc.

The proxy contact identifier selection component 304 communicates with the data storage 208 to access the pool of available proxy contact identifiers, and selects one or more available proxy contact identifiers for use in the anonymized communication session. For example, the proxy contact identifier selection component 304 identifies proxy contact identifiers that are not being used for other anonymized communication sessions, and selects from the identified proxy contact identifiers. The proxy contact identifier selection component 304 may select a unique proxy contact identifier for each participant of the anonymized communication session or, alternatively, select a proxy contact identifier that will be used by multiple participants of the communication session.

The proxy contact identifier selection component 304 may select proxy contact identifiers that are best suited for the participants of the anonymized communication session. For example, the proxy contact identifier selection component 304 may select proxy contact identifiers based on the location of a participant of the anonymized communication session. That is, the proxy contact identifier selection component 304 may select a phone number that has an area code that is local to a participant of the communication session.

Upon selecting a proxy contact identifier for use in an anonymized communication session, the proxy contact identifier selection component 304 updates the pool of available proxy contact identifiers to indicate that the selected proxy contact identifier is no longer available. For example, the proxy contact identifier selection component 304 updates the status of the selected proxy contact identifier to indicate that they are in use by an anonymized communication session.

At operation 506, the anonymized communication record creation component 306 generates an anonymized communication record for the anonymized communication session. The anonymized communication record includes data associated with the anonymized communication session, such as the contact identifiers for the client devices 102, 104 of the participants of the anonymized communication session, as well as the proxy contact identifiers assigned for use by the participants.

The anonymized communication record creation component 306 may generate a unique identifier for the anonymized communication session, which is stored in the anonymized communication record along with account/user identifiers for the participants of the anonymized communication session. The anonymized communication record may also include data describing conditions for the anonymized communication session, such as a start and end time of the anonymized communication session, types of communications that can be transmitted as part of the anonymized communication session, client devices 102, 104, that are authorized for use in the anonymized communication session, etc.

The anonymized communication record creation component 306 stores the generated anonymized communication record in the data storage 208. The stored anonymized communication record may be associated with the unique identifier assigned to the anonymized communication record, which may be used to search for and identify the anonymized communication record.

At operation 508, the output component 308 causes the proxy contact identifiers to be provided to the participants of the anonymized communication session. For example, the output component 308 transmits the proxy contact identifiers directly to the participants' client devices 102, 104. Alternatively, the output component 308 provides the proxy contact identifiers to the online service 106, and the online service 106 provides the proxy contact identifiers to the client devices 102, 104.

Figure 6:
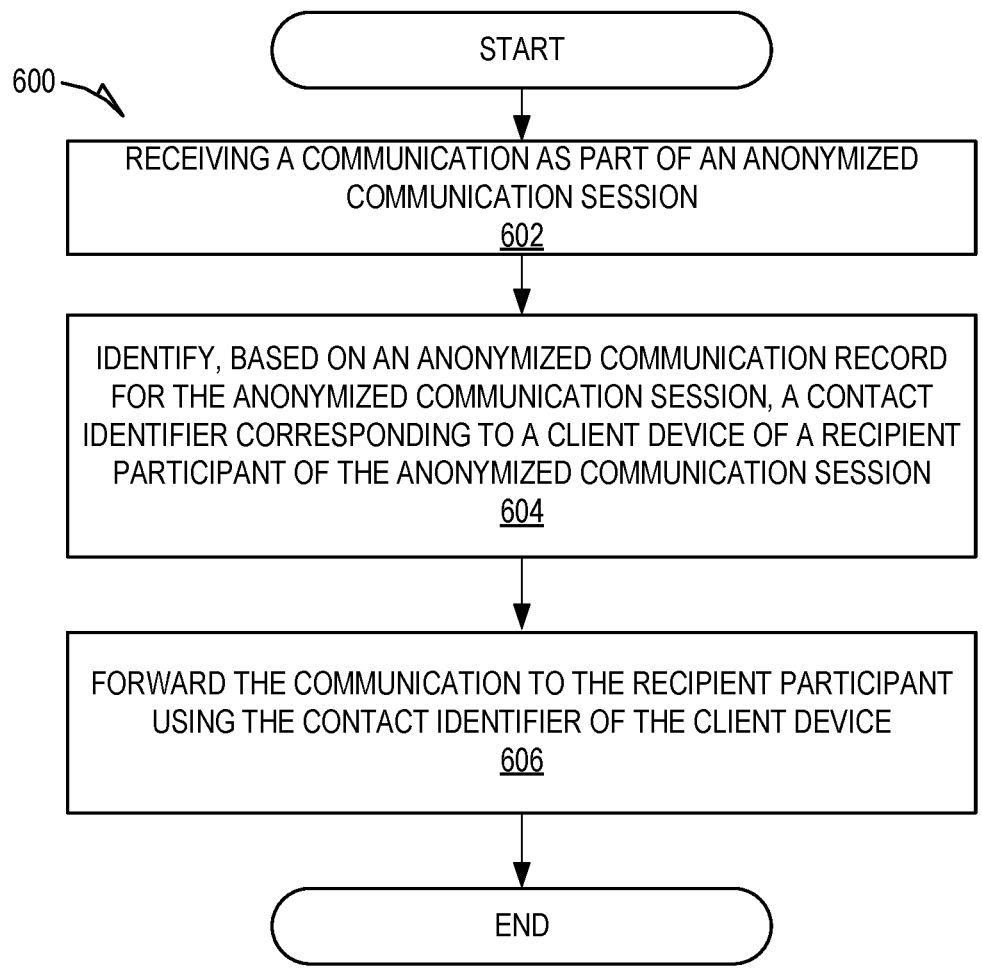
FIG. 6 is a flowchart showing an example method of forwarding messages in an anonymized communication session, according to some example embodiments.

FIG. 6 is a flowchart showing an example method 600 of forwarding messages in an anonymized communication session, according to some example embodiments. The method 600 may be embodied in computer readable instructions for execution by one or more processors such that the operations of the method 600 may be performed in part or in whole by the anonymized communication platform 108; accordingly, the method 600 is described below by way of example with reference thereto. However, it shall be appreciated that at least some of the operations of the method 600 may be deployed on various other hardware configurations and the method 600 is not intended to be limited to the anonymized communication platform 108.

At operation 602, the communication routing component 206 receives a communication as part of an anonymized communication session. The communication is received from a client device 102, 104 of a participant of the anonymized communication session. The communication is transmitted to the anonymized communication platform 108 using a proxy contact identifier that was assigned to the anonymized communication session.

At operation 604, the anonymized communication session identification component 402 identifies, based on an anonymized communication record for the anonymized communication session, a contact identifier corresponding to a client device 102, 104 of a recipient participant of the anonymized communication session. The anonymized communication record includes the contact identifiers for the participants of the anonymized communication session. The session identification component 402 identifies the anonymized communication record for the anonymized communication session by searching the data storage 208 based on the proxy contact identifier used to transmit the received communication and/or a unique identifier assigned to the anonymized communication session. For example, the communication may include the unique identifier associated with the anonymized communication session, which the anonymized communication session identification component 402 uses to identify the appropriate anonymized communication record in the data storage 208.

At operation 606, the communication connection component 406 forwards the communication to the recipient participant using the contact identifier of the client device 102, 104. That is, the communication connection component 406 uses the contact identifies retrieved from the anonymized communication record to forward the communication to the intended recipient's client device 102, 104. This may include forwarding a message, such as a text message, instant message, etc., to the recipient's client device 102, 104, or connecting the client devices 102, 104 of the sender and recipient participants. For example, the communication connection component 406 may cause the client device 102, 104 to be connected for audio communication, such as a phone call.

Figure 7:
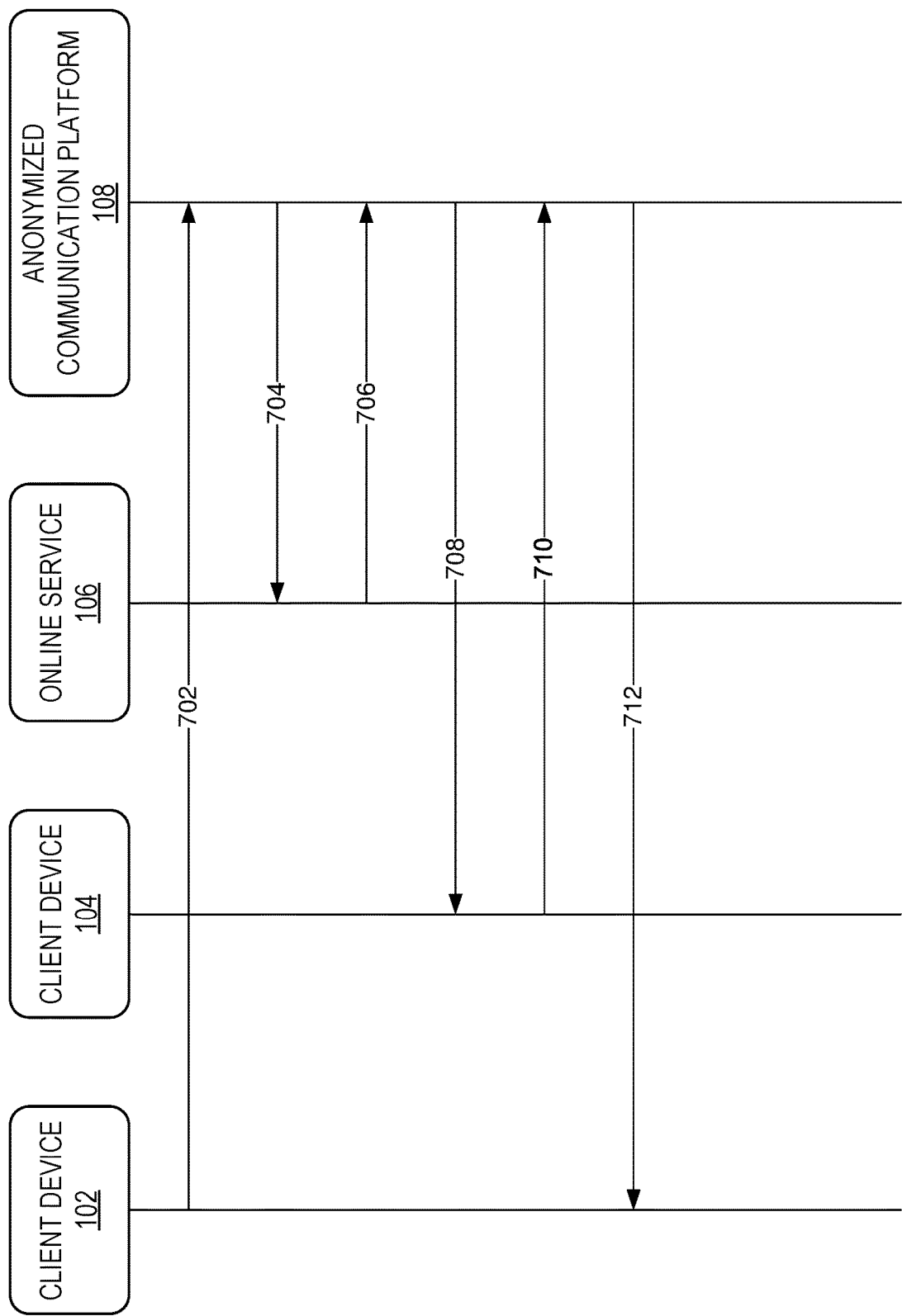
FIG. 7 shows computing devices dynamically initiating an anonymized communication session, according to some example embodiments.

FIG. 7 shows computing device dynamically initiating an anonymized communication session, according to some example embodiments. As shown, a participant uses their client device 102 to transmit a request 702 to the anonymized communication platform to initiate an anonymized communication session with another user of the online service 106. In this type of embodiment, the anonymized communication session has not yet been initiated. That is, the online service provides the user of the client device 102 with a proxy contact identifier to initiate an anonymized communication session, however the anonymized communication platform 108 has not yet generated an anonymized communication record for the anonymized communication session. For example, the online service 106 may provide the client device 102 of a rider with a message such as "text 12345 to connect with your driver" upon the driver and rider being paired using a ride sharing service provided by the online service 106. The user may use the provided proxy contact identifier (e.g., 12345) to initiate an anonymized communication session with the driver.

The request 702 is transmitted from the client device 102 to the anonymized communication platform 108 in response to a user selecting to initiate an anonymized communication session. For example, the rider selects to use the provided proxy contact identifier (e.g., 12345) to contact the paired driver. In this type of embodiment, the request 702 may include a communication as well. For example, the request 702 may include a text message or be a request to initiate a phone call with the other participant.

In response to receiving the request 702, the anonymized communication platform 108 gathers information 704 from the online service 106 to initiate the anonymized communication session. The information may include contact identifiers of the participants of the anonymized communication session. For example, the anonymized communication platform 108 provides the online service 106 with a user/account identifier for the user that transmitted the request 702, and the online service 106 uses the received user/account identifier to identify and return 706 other information needed to initiate the anonymized communication session, such as the user/account identifier of the other participants of the anonymized communication session, contact identifiers of the participants, conditions of the anonymized communication session, etc.

The online service 106 returns 706 the requested information to the anonymized communication platform 108. The anonymized communication platform 108 uses the information to initiate an anonymized communication session for the users. That is, the anonymized communication platform 108 selects proxy contact identifiers and generates an anonymized communication record for the anonymized communication session.

After initiating the anonymized communication session, the anonymized communication platform 108 forwards the message 708 to the client device 104 of the recipient user. The message 708 includes the communication (e.g., text message) provided by the client device 102 that requested to initiate the anonymized communication session, as well as the proxy contact identifier that the recipient client device 104 may use to participate in the anonymized communication session.

The recipient user may use the proxy contact identifier included in the message 708 to participate in the anonymized communication session. For example, the client device 104 uses the proxy contact identifier to transmit a response communication 710 to the anonymized communication platform 108. The anonymized communication platform 108 forwards the communication 712 to the client device 102 of the other participant of the anonymized communication session.

Figure 8:
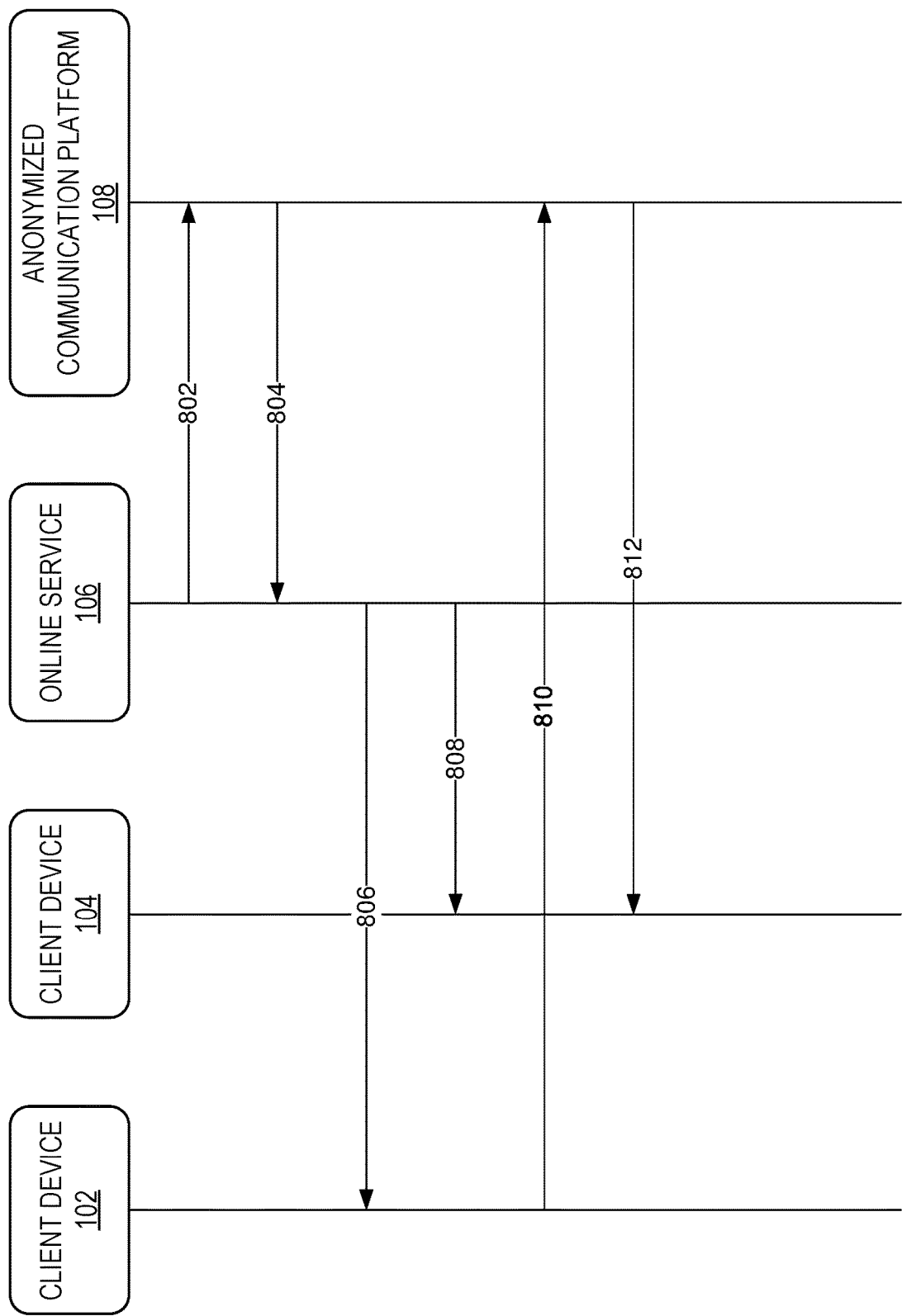
FIG. 8 shows computing devices preemptively initiating an anonymized communication session, according to some example embodiments.

FIG. 8 shows computing device preemptively initiating an anonymized communication session, according to some example embodiments. As shown, the online service 106 transmits a request 802 to the anonymized communication platform 108 to initiate an anonymized communication session. The request 802 includes information used by the anonymized communication platform 108 to initiate the anonymized communication session. In response to receiving the request, the anonymized communication platform 108 selects proxy contact identifiers for the participant of the anonymized communication session, and generates an anonymized communication record.

The anonymized communication platform 108 returns 804 the proxy contact identifiers to the online service 106. Subsequently, the online service 106 transmits 806, 808 the proxy contact identifiers to the participants' client devices 102, 104. The participants use the proxy contact identifiers to participate with the other participants in the anonymized communication session. For example, a participant uses their client device 102 to transmit a communication 810 via the provided proxy contact information. The communication 810 is initially transmitted to the anonymized communication platform 108, which then forwards the communication 812 to the client device 104 of the intended recipient participant.

Figure 9:
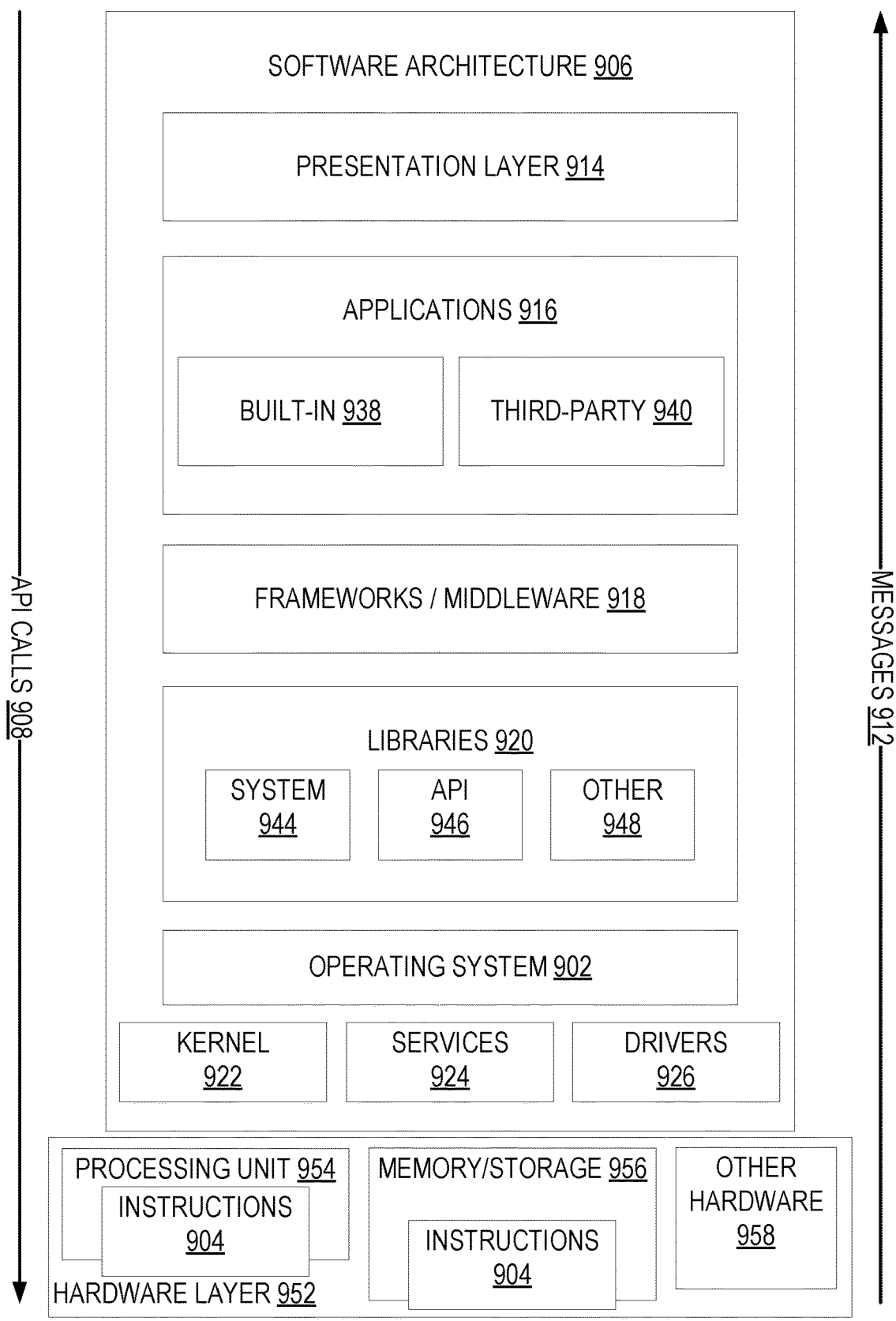
FIG. 9 is a block diagram illustrating a representative software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
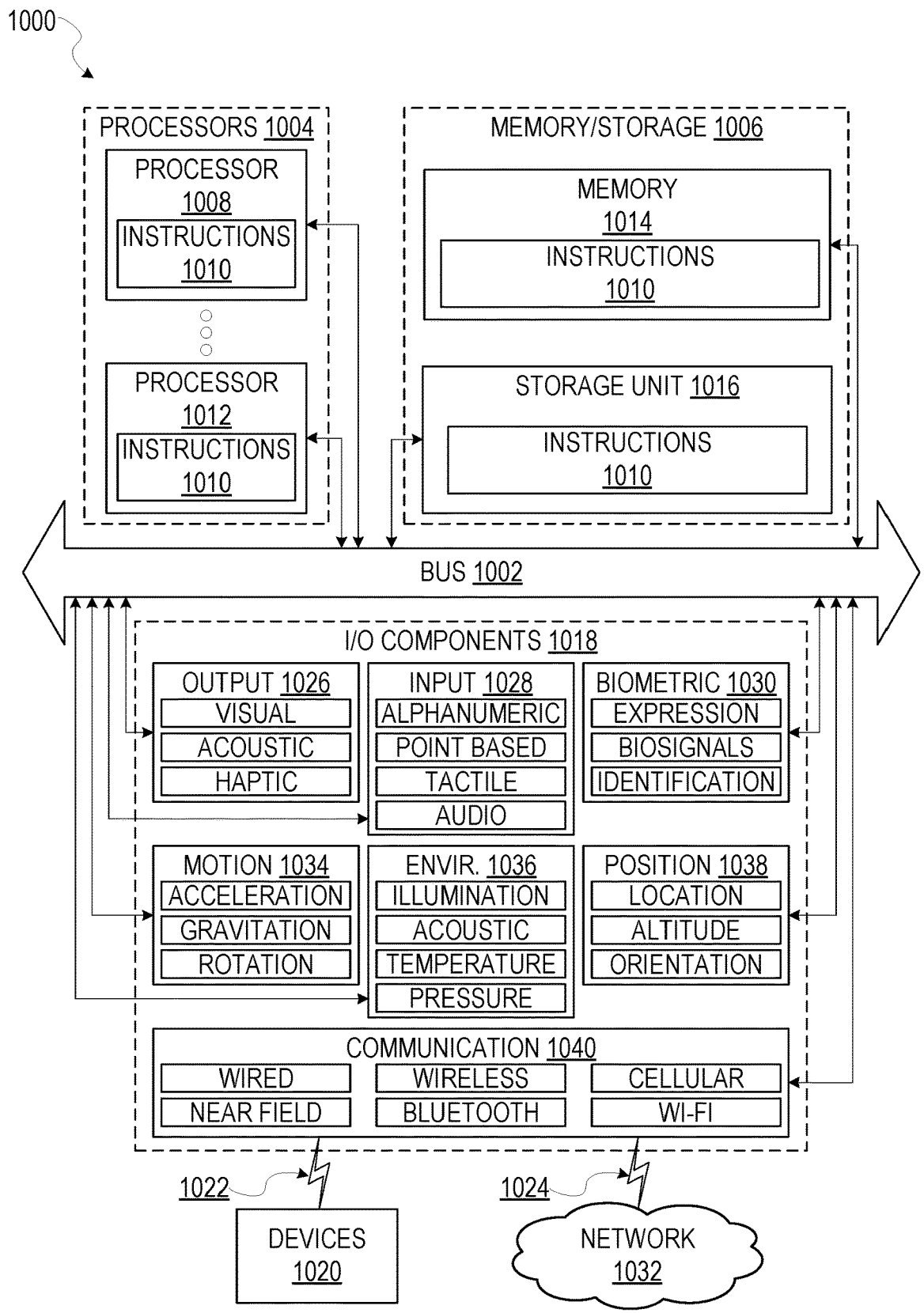
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device 102, 104 may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 1004 (sometimes referred to as "cores") that may execute instructions 1010 contemporaneously.

What is claimed is:

1. A method comprising:
   providing, by an anonymized communication platform, an Application Programming Interface (API) to an online service, the online service incorporating the API into a client-side application provided by the online service to users of the online service, the API incorporated into the client-side application providing the users of the online service to initiate anonymized communication sessions facilitated by the anonymized communication platform as part of the online service, the online service being a separate entity from the anonymized communication platform;
   receiving, at the anonymized communication platform, a request from a first client device that is executing the client-application provided by the online service, the request being to initiate an anonymized communication session between the first client device and a second client device as part of the online service, the first client device being associated with a first user of the online service and the second client device being associated with a second user of the online service, the API of the anonymized communication platform that is incorporated into the client-side application causing the client device to transmit the request to the anonymized communication platform;

in response to receiving the request, selecting, from a set of available proxy contact identifiers, a first proxy contact identifier for the first user, the first proxy contact identifier enabling communication with the anonymized communication platform;

generating an anonymized communication record for the anonymized communication session between the first client device and the second client device, the anonymized communication record indicating that the first proxy contact identifier is assigned to the first contact identifier for the first client device; and causing the first proxy contact identifier to be provided to the second client device associated with the second user, the first proxy contact identifier enabling the second client device to communicate with the first client device during the anonymized communication session.

2. The method of claim 1, further comprising:
receiving, from the second client device, a communication for the first user, the communication having been transmitted by the second client device using the first proxy contact identifier;
identifying, based on the anonymized communication record, that the first proxy contact identifier is assigned to the first contact identifier for the first client device; and
transmitting the communication to the first client device using the first contact identifier.

3. The method of claim 1, wherein selecting the first proxy contact identifier comprises:
determining a current location of the second client device;
identifying, from the set of available proxy contact identifiers, a subset of available proxy contact identifiers that are associated with the current location of the second client device; and
selecting the first proxy contact identifier from the subset of available proxy contact identifiers that are associated with the current location of the second client device.

4. The method of claim 1, further comprising:
selecting, from the set of available proxy contact identifiers, a second proxy contact identifier for the second user, the second client device being reachable using a second contact identifier;
updating the anonymized communication record to indicate that the second proxy contact identifier is assigned to the second contact identifier for the second client device; and
causing the second proxy contact identifier to be provided to the first client device for use by the first user to communicate with the second user during the anonymized communication session.

5. The method of claim 4, wherein the first proxy contact identifier and the second proxy contact identifier are a same proxy contact identifier.

6. The method of claim 4, wherein the first contact identifier is a first phone number, and the first proxy contact identifier is a second phone number that is different than the first phone number.

7. The method of claim 1, wherein causing the first proxy contact identifier to be provided to the second client device comprises:

returning the first proxy contact identifier to the online service in response to the request, wherein the online service provides the first proxy contact identifier to the second client device.

8. The method of claim 1, wherein the request is received from the online service in response to the first user and the second user being paired through the online service.

9. The method of claim 1, wherein the request is received from the first client device as a result of the first user using the online service to initiate communication with the second user.

10. The method of claim 1, further comprising:
receiving a second request to initiate a second anonymized communication session between the first user and a third user of the online service;
in response to receiving the second request, selecting a second proxy contact identifier for the first user, the second proxy contact identifier being different than the first proxy contact identifier, and the second proxy contact identifier enabling communication with the anonymized communication platform;
generating a second anonymized communication record for the second anonymized communication session between the first user and the third user, the second anonymized communication record indicating that that the second proxy contact identifier is assigned to the first contact identifier for the first client device;
causing the second proxy contact identifier to be provided to a third client device associated with the third user, the second proxy contact identifier enabling the second user to communicate with the first user during the second anonymized communication session;
while the first communication session is active, receiving, from the third client device, a communication for the first user, the communication having been transmitted by the third client device using the second proxy contact identifier;
identifying, based on the second anonymized communication record, that the second proxy contact identifier is assigned to the first contact identifier for the first client device; and
transmitting the communication to the first client device using the first contact identifier.

11. An anonymized communication platform comprising:
one or more computer processors; and
one or more computer-readable mediums storing instructions that, when executed by the one or more computer processors, cause the anonymized communication platform perform operations comprising:
providing, by an anonymized communication platform, an Application Programming Interface (API) to an online service, the online service incorporating the API into a client-side application provided by the online service to users of the online service, the API incorporated into the client-side application providing the users of the online service to initiate anonymized communication sessions facilitated by the anonymized communication platform as part of the online service, the online service being a separate entity from the anonymized communication platform;
receiving a request from a first client device that is executing the client-application provided by the online service, the request being to initiate an anonymized communication session between the first client device and a second client device as part of the online service, the first client device being associated with a first user of the online service and the second client device being associated with a second user of the online service, the API of the anonymized communication platform that is incorporated into the client-side application causing the client device to transmit the request to the anonymized communication platform;

in response to receiving the request, selecting, from a set of available proxy contact identifiers, a first proxy contact identifier for the first user, the first proxy contact identifier enabling communication with the anonymized communication platform;

generating an anonymized communication record for the anonymized communication session between the first client device and the second client device, the anonymized communication record indicating that the first proxy contact identifier is assigned to the first contact identifier for the first client device; and causing the first proxy contact identifier to be provided to the second client device associated with the second user, the first proxy contact identifier enabling the second client device to communicate with the first client device during the anonymized communication session.

12. The anonymized communication platform of claim 1, the operations further comprising:

receiving, from the second client device, a communication for the first user, the communication having been transmitted by the second client device using the first proxy contact identifier;

identifying, based on the anonymized communication record, that the first proxy contact identifier is assigned to the first contact identifier for the first client device; and transmitting the communication to the first client device using the first contact identifier.

13. The anonymized communication platform of claim 11, wherein selecting the first proxy contact identifier comprises:

determining a current location of the second client device;

identifying, from the set of available proxy contact identifiers, a subset of available proxy contact identifiers that are associated with the current location of the second client device; and selecting the first proxy contact identifier from the subset of available proxy contact identifiers that are associated with the current location of the second client device.

14. The anonymized communication platform of claim 11, the operations further comprising:

selecting, from the set of available proxy contact identifiers, a second proxy contact identifier for the second user, the second client device being reachable using a second contact identifier;

updating the anonymized communication record to indicate that the second proxy contact identifier is assigned to the second contact identifier for the second client device; and causing the second proxy contact identifier to be provided to the first client device for use by the first user to communicate with the second user during the anonymized communication session.

15. The anonymized communication platform of claim 14, wherein the first proxy contact identifier and the second proxy contact identifier are a same proxy contact identifier.

16. The anonymized communication platform of claim 11, wherein causing the first proxy contact identifier to be provided to the second client device comprises:

returning the first proxy contact identifier to the online service in response to the request, wherein the online service provides the first proxy contact identifier to the second client device.

17. The anonymized communication platform of claim 11, wherein the request is received from the online service in response to the first user and the second user being paired through the online service.

18. The anonymized communication platform of claim 11, wherein the request is received from the first client device as a result of the first user using the online service to initiate communication with the second user.

19. The anonymized communication platform of claim 1, the operations further comprising:

receiving a second request to initiate a second anonymized communication session between the first user and a third user of the online service;

in response to receiving the second request, selecting a second proxy contact identifier for the first user, the second proxy contact identifier being different than the first proxy contact identifier, and the second proxy contact identifier enabling communication with the anonymized communication platform;

generating a second anonymized communication record for the second anonymized communication session between the first user and the third user, the second anonymized communication record indicating that that the second proxy contact identifier is assigned to the first contact identifier for the first client device;

causing the second proxy contact identifier to be provided to a third client device associated with the third user, the second proxy contact identifier enabling the second user to communicate with the first user during the second anonymized communication session;

while the first communication session is active, receiving, from the third client device, a communication for the first user, the communication having been transmitted by the third client device using the second proxy contact identifier;

identifying, based on the second anonymized communication record, that the second proxy contact identifier is assigned to the first contact identifier for the first client device; and transmitting the communication to the first client device using the first contact identifier.

20. A non-transitory computer-readable medium storing instructions that, when executed by one or more computer processors of an anonymized communication platform, cause the anonymized communication platform perform operations comprising:

providing, by an anonymized communication platform, an Application Programming Interface (API) to an online service, the online service incorporating the API into a client-side application provided by the online service to users of the online service, the API incorporated into the client-side application providing the users of the online service to initiate anonymized communication sessions facilitated by the anonymized communication platform as part of the online service, the online service being a separate entity from the anonymized communication platform;

receiving a request from a first client device that is executing the client-application provided by the online service, the request being to initiate an anonymized communication session between the first client device and a second client device as part of the online service, the first client device being associated with a first user of the online service and the second client device being associated with a second user of the online service, the API of the anonymized communication platform that is incorporated into the client-side application causing the client device to transmit the request to the anonymized communication platform;

in response to receiving the request, selecting, from a set of available proxy contact identifiers, a first proxy contact identifier for the first user, the first proxy contact identifier enabling communication with the anonymized communication platform;

generating an anonymized communication record for the anonymized communication session between the first client device and the second client device, the anonymized communication record indicating that the first proxy contact identifier is assigned to the first contact identifier for the first client device; and causing the first proxy contact identifier to be provided to the second client device associated with the second user, the first proxy contact identifier enabling the second client device to communicate with the first client device during the anonymized communication session.

\* \* \* \* \*